United States Patent Office 3,058,909  
Patented Oct. 16, 1962

3,058,909  
METHOD AND COMPOSITION FOR FORMATION FRACTURING  
Loyd R. Kern, Irving, Tex., assignor to The Atlantic Refining Company, Philadelphia, Pa., a corporation of Pennsylvania  
No Drawing. Filed July 23, 1957, Ser. No. 673,564  
5 Claims. (Cl. 252—8.55)

The present invention relates to the treatment of subsurface earth formations to increase their permeability to fluids. More particularly, the present invention relates to the treatment of subsurface formations to increase their permeability to fluids by providing porous, lateral flow channels or fractures extending from a well bore into selected formations forming the walls of the well bore. In a still more specific aspect, the present invention relates to improved fluids for use in formation fracturing operations and improved methods of fracturing employing such fluids.

In the are of increasing the permeability to fluids of subsurface formations, it is known that improved productivity of oil or gas from hydrocarbon-bearing formations and improved injectivity of fluids in injection wells can be obtained by creating or enlarging flow channels or fractures extending from the well bore into such preselected formations. Such fractures may be created or existing fractures may be enlarged by various methods involving the application of high pressures to fluids disposed in the well bore adjacent the formation to be treated. In some cases, the mere opening of one or more flow channels or fractures will, in itself, greatly increase the permeability of the formation. However, in a majority of treatments, it is also necessary to deposit a propping agent in the open fracture in order to prevent it from closing off and thereby substantially reducing the advantage gained by the initial opening of the fracture. This introduction of the propping agent is generally carried out by suspending the propping agent in a fluid and forcing the fluid into the open channel. Finally, the introduction of the propping agent is sometimes followed by a flushing step. Depending upon the nature of the fluids employed to open the fracture and to carry the propping agent into the fracture, such flushing is performed by circulating a third fluid into the formation to act as a solvent or diluent, or by merely producing the formation fluids, thereby utilizing the formation fluids as the diluting or solvating agent.

In the art of fracturing subsurface earth formations to increase their permeability to fluids, it was originally thought that the fluid employed to open the fracture and the fluid employed to carry propping agents into such fracture should be basically the same as the fluids to be produced from or injected into the formation under consideration. In other words, in fracturing an oil- or gas-producing formation, it was generally thought that organic fluids should be used throughout the fracturing operation, in order to prevent contamination of the formation; whereas, in the treatment of water-disposal formations aqueous fluids should be employed. More recently it has been found that, in many cases, oil- or gas-bearing formations as well as water-disposal formations can be fractured with aqueous fluids without deleteriously affecting the subject formation. Accordingly, recent trends in fracturing operations have shown an increase in the use of aqueous fluids in fracturing operations on oil- and gas-bearing formations, and the volumes of fluids used in such operations have also substantially increased.

In the early days of fracturing, it was also believed that all fracturing operations should be carried out with highly viscous fluids in both the steps of opening the fracture and introducing the propping agent into the fracture. This has also been disproven by experience gained by operators in conducting fracturing operations. Accordingly, many fracturing operations are now carried out by employing nonviscous fluids both to open the fracture and to carry a propping agent into the fracture. The most prevalent practice, however, is to employ a nonviscous fluid to open the fracture and a fluid which has been treated to increase its viscosity or ability to suspend propping agents or to decrease its fluid-loss properties, or both, to deposit the propping agent in the fracture. However, it is still considered desirable in some cases to employ a viscous fluid or one having low fluid-loss characteristics to open a fracture in highly permeable formations. By employing fluids of this character, it is possible to reduce the rate capacity of the pumping equipment. Likewise, it is also desirable in many cases to employ propping agent carrier fluids which have been treated to increase their ability to suspend propping agents, particularly where propping agents of high specific gravity are employed, and to lower the fluid-loss characteristics of the carrier fluid.

The above-mentioned increase in the use of aqueous fluids in fracturing operations and the trend towards increasing the volume of such fluids create several problems, particularly where it is desirable to employ fluids having increased solids-suspending properties or low fluid-loss characteristics. A number of additives are presently available which both increase the suspending properties of the fluid and decrease the fluid-loss characteristics of the fluid. However, the materials which are presently available for the treatment of aqueous fluids must be employed in comparatively high concentrations and, accordingly, are comparatively expensive, particularly where large volumes of aqueous fluids are to be employed. It is, therefore, highly desirable the aqueous fluids having the desired solids-suspending properties and fluid-loss characteristics be provided at a reasonable cost in order to justify the use of such materials.

It is, therefore, an object of the present invention to provide an improved method and composition for opening fractures in subsurface earth formations.

Another object of the present invention is to provide an improved method and composition for carrying propping agents into fractures in subsurface earth formations.

Still another object of the present invention is to provide a fluid for use in formation fracturing operations which exhibits improved fluid-loss properties.

Another and further object of the present invention is to provide a fluid for use in formation fracturing operations which exhibits improved solids-suspending properties.

A further object is to provide a treating agent for fluids employed in formation fracturing operations which is capable of producing fluid-loss properties equivalent to known fluid-loss agents when employed in substantially smaller quantities than such known materials.

A still further object of the present invention is to provide a treating agent for fluids employed in formation fracturing operations which is capable of producing solids-suspending properties equivalent to known materials when employed in substantially smaller quantities than such known materials.

These and other objects of the instant invention will be apparent from the following detailed description.

It has been found, in accordance with the present invention, that aqueous fluids having improved solids-suspending properties and improved fluid-loss characteristics can be obtained by incorporating in an aqueous medium a complex of a polyorganic compound having at least one reactive unit consisting of two adjacent hydroxyl groups arranged in a "cis" configuration and a boron compound capable of supplying borate ions in an aqueous solution. It has been found that water or other aqueous solutions, such as, emulsions in which water is the external phase, can be converted into fracturing fluids having improved solids-suspending properties and fluid-loss characteristics by the addition of such complex in extremely low concentrations as compared with the concentrations of these same polyorganic compounds or other well known fluid-loss agents presently in use.

The polyorganic compounds contemplated herein are desirably compounds having high molecular weights, since, to some extent, the molecular weight of this base compound will determine the solids-suspending properties of the treated fluid. Accordingly, high molecular weight carbohydrates having the above-specified structure are most desirable. Particular polyorganic compounds falling within this class are guar gum and locust beam gum.

By way of illustration, guar gum is essentially a straight chain polymer of mannose units linked in a 1-4 beta-glucosidic linkage and having gallactose branching on alternate mannose units. This particular material has an average molecular weight of about 220,000. The established structure of the guar gum molecule may be illustrated as follows:

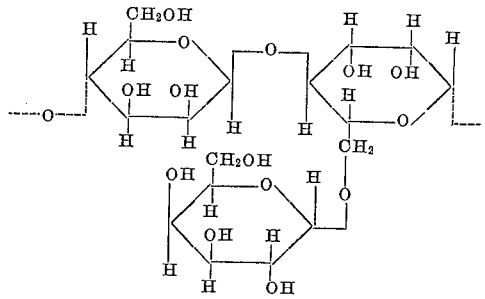

Boron compounds suitable for use in preparing the complexes of the instant invention include any boron compound which will supply borate ions in an aqueous solution; for example, boric acid, sodium biborate, potassium tetraborate, sodium tetraborate (borax), and the like.

Although it has not been definitely established whether borate ions form a chemical compound with the polyorganic compounds of this invention or whether a complex is formed, it has been established that the borate ions act as a bonding agent between the molecules of such polyorganic compounds. In any event, this bonding will be referred to herein as the formation of a "complex" and may be illustrated by the following type reaction:

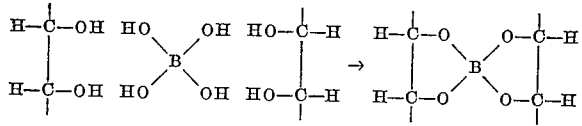

The fracturing fluids of the present invention are prepared by dispersing the desired amount of the polyorganic compound in water, adjusting the pH of the solution to the alkaline side preferably between pH 8.5 to 12, and thereafter adding a boron compound. In this manner, a gelatinous fluid of high viscosity and low fluid loss is obtained. The viscosity and fluid-loss characteristics of the fracturing fluid may be adjusted simply by adjusting the concentration of polyorganic compound employed.

It is believed that a specific example of the method of preparing the subject complex and the characteristics of fluids containing such complex will aid in the understanding of the present invention. A laboratory batch of the complex was prepared as follows: 1 gram of guar gum was dissolved in 400 cc. of water, 6 drops of NaOH solution were added to adjust the pH of the gum solution to 11, and 6 cc. of a saturated solution of borax was then added with mixing. The resultant gel was found to have an A.P.I. fluid loss of 23 cc. at 75° and 28 cc. at 150° F., as measured in accordance with A.P.I. RP No. 29, third edition, May 1950 (tentative). Obviously, larger volumes of the subject fluid may be prepared by simply adjusting the amounts of constituents upwardly.

It has been found that concentrations as low as 0.25 percent by weight of the complex based on the total weight of the solution, will provide excellent fracturing fluids. Larger amounts of complex may be employed depending upon the final characteristics desired. However, no useful purpose is served by employing amounts of the complex above 1 percent, since the fluid-loss characteristics which result are much lower than those normally required for fracturing fluids and the advantage of lower cost as compared with present day agents would be lost. In most cases, the preferred concentration is between 0.35 and 0.5 percent. A concentration of 0.5 percent of the polyorganic compound, when treated with borax, will result in a fluid having viscosity and fluid-loss ratings equal to that obtained when 1 percent of the same polyorganic material without borax is employed. Thus, it may be seen that equivalent results may be obtained by using concentrations of the complex which are approximately half as great as those concentrations presently employed and that substantially superior results may be obtained by using the complex of the present invention in concentrations equal to the concentrations of treating agents currently used.

It has also been found that the complex of the instant invention is highly stable under high temperature conditions if critical minimum concentrations of the complex are employed. For example, it was found that concentrations below 0.35 percent rapidly lose their gel structure when subjected to temperatures in excess of 150° F. However, concentrations above this critical concentration are stable when subjected to temperatures of 150° F. for several hours. These observations are of particular importance in fracturing operations since many formation temperatures are within this range or higher.

The necessity of employing polyorganic compounds having at least one reactive group consisting of two adjacent hydroxyl groups arranged in a "cis" configuration to form the complex can be illustrated by comparing materials of this nature with other carbohydrates whose chemical structures are quite similar except for the "cis" configuration of the hydroxyl groups. For example, starch is a polymeric material having the following structural form:

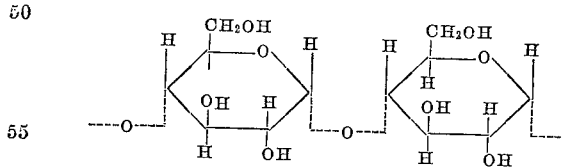

Experimental attempts to form a complex of starch and borate ions were unsuccessful, since the viscosity and fluid-loss properties were essentially the same for fluids containing starch alone and fluids containing the combination of starch and borax. Similar treatments were carried out employing hydrolyzed sugar (dextrose) and similar sugars, oil well starch and conventional starches, and "Gelcarin" (Irish moss extract). The properties of these materials were not affected by the addition of boron compounds.

A further advantage of the complex of the present invention is that these materials form a tough, tenacious filtercake on the walls of the formation fracture under ordinary conditions of use, but the structure of these materials is readily broken by various treatments which are effective in destroying the gel structures of starches, water-dispersible natural gums and other like materials. For example, enzyme action by bacteria present in the formation treated or added to the solution will break down the gel structure of the fluids of the present invention after an extended period of time. Similarly, since free borate ions are necessary to the formation of the complex of this invention, the gel structure may be broken simply by adjusting the pH of the solution to the acid side. Accordingly, inhibited acid may be added to the fracturing fluid itself or acidization may be carried out following the fracturing treatment.

The novel fracturing fluids of the instant invention may be employed in any one of the various steps of a fracturing operation in which it is advantageous to use an aqueous fluid having a high viscosity, high solids-suspending properties, low fluid-loss characteristics or all three. For instance, in order to create a fracture or to enlarge an existing fracture, the complex treated fluid is disposed in the well bore opposite the formation to be treated; and a pressure sufficient to crack the formation or enlarge the fracture is applied to the fluid in accordance with procedures well known to those skilled in the art. When the fracture created or enlarged in accordance with the above procedure is to be propped with a solid-particle form propping agent or a fracture formed by other methods or naturally occurring fractures are to be propped, a propping agent, such as, sand and the like is suspended in the complex treated fluid by mixing or other means, the solids-containing fluid is disposed in the well bore adjacent the fractured formation and sufficient pressure is applied to the fluid to force it into the fracture.

I claim:

1. In a method for providing lateral flow channels in a subsurface earth formation wherein aqueous fracturing solutions normally subject to rapid filtration through the pores of the formation are employed, the improvement comprising adding to an aqueous fracturing fluid an organic compound selected from the class consisting of guar gum and locust bean gum, sufficient boron compound capable of supplying enough borate ions to react with said organic compound and capable of maintaining free borate ions in said fluid, sufficient alkaline material to raise the pH of said fluid to above 8.0, the concentration of said organic compound and said borate compound in said fracturing fluid being sufficient to produce a mixture having an A.P.I. fluid loss of less than 30 cc., and forcing said resulting aqueous fracturing solution into said formation.

2. In a method for providing lateral flow channels in a subsurface formation wherein an aqueous fracturing solution normally subject to rapid filtration through the pores of the formation is employed, the improvement comprising adding to an aqueous fracturing fluid at least 0.35 percent by weight of water of an organic compound selected from the class consisting of guar gum and locust bean gum, sufficient boron compound capable of supplying enough borate ions to react with said organic compound and capable of maintaining free borate ions in said fluid, and sufficient alkaline material to raise the pH of said fluid to above 8.0, and forcing said aqueous solution into said formation.

3. The method of claim 2 wherein between 0.35 and 1.0 percent by weight of water of the organic compound is added.

4. The method of claim 2 wherein between 0.35 and 0.5 percent by weight of water of the organic compound is added.

5. In a method for providing lateral flow channels in a subsurface formation wherein an aqueous fracturing solution normally subject to rapid filtration through the pores of the formation is employed, the improvement comprising adding to an aqueous fracturing fluid between 0.25 and 1.0% by weight of water of an organic compound selected from the class consisting of guar gum and locust bean gum, sufficient boron compound capable of supplying enough borate ions to react with said organic compound and capable of maintaining free borate ions in said fluid, and sufficient alkaline fluid to raise the pH of said fluid to above 8.0, and forcing said aqueous solution into said formation.

References Cited in the file of this patent

UNITED STATES PATENTS

| | | |
|---|---|---|
| 2,006,426 | Weiler | July 2, 1935 |
| 2,483,936 | Roberts | Oct. 4, 1949 |
| 2,525,783 | Farrow | Oct. 17, 1950 |
| 2,576,955 | Ludwig | Dec. 4, 1951 |
| 2,644,765 | Frisch et al. | July 7, 1953 |
| 2,681,704 | Menaul | June 22, 1954 |
| 2,731,414 | Binder et al. | Jan. 17, 1956 |
| 2,801,218 | Menaul | July 30, 1957 |
| 2,854,407 | Mallory | Sept. 30, 1958 |

OTHER REFERENCES

Deuel et al.: The Reaction of Boric Acid and Borax With Polysaccharides, Chemical Abstracts, vol. 43, page 949, col. 6986.

Haug: Guar Mannogalactan Studies, article in Tappi, January 1953, vol. 36, No. 1, pages 53 and 54.